Sept. 15, 1942.   W. J. CAMPBELL   2,295,772
COMBINED VALVE FACING AND SECURING MEANS
Filed Aug. 3, 1940
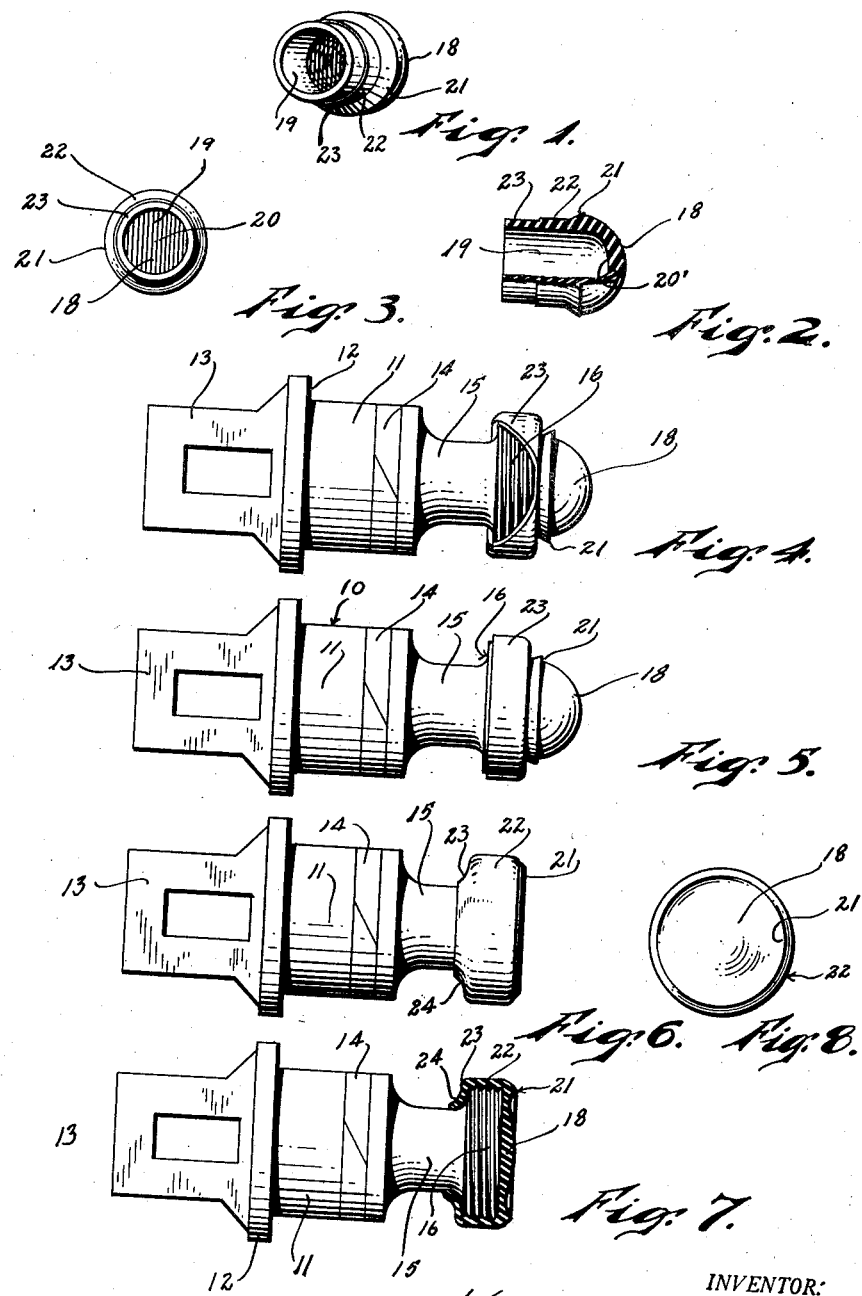
INVENTOR:
WALTER J. CAMPBELL,
BY:
Horace J Woodward
ATTORNEY.

Patented Sept. 15, 1942

2,295,772

UNITED STATES PATENT OFFICE 2,295,772

COMBINED VALVE FACING AND SECURING MEANS

Walter J. Campbell, Philadelphia, Pa., assignor to Keystone Brass & Rubber Co., Philadelphia, Pa., a corporation of Pennsylvania Application August 3, 1940, Serial No. 351,037

5 Claims. (Cl. 251—159)

The invention relates to facings for valves of the ball type, particularly those used in flush tanks and elsewhere, and has for an object to enable the rapid renewal of the rubber facing on such valves without requiring the use of tools, and without requiring the plumber to carry a large stock of various sizes.

At present there are two methods of forming a face on such valves to engage the seat in the valve port, one consisting in the use of a washer held to a flat face on the valve by means of a screw engaged through the washer and in the valve, and another very largely used method now general is by the use of a flat disc of suitable facing material held upon the head of the valve by means of an interiorly threaded ring screwed upon the head of the valve, and having a flange engage over the edges of the disc and holding the same against the platen face of the valve head. It is a serious objection to both of these methods, that the screw or the clamping ring will corrode and be finally destroyed, the screw often breaking off when it is attempted to renew the washer held thereby, and the clamp ring becoming loose at times, even before it is corroded sufficiently to break. It is another objection to the clamp ring type of valve facing that if the ring is not screwed very tightly upon the head, high water pressures will work around the ring and get under the disc facing, bulging the latter and destroying the proper seating of the valve. It is a serious objection to the clamping rings type of facing that there is no uniformity of practices among the manufacturers of such valves as to size of the rings, pitch of threads, size of the flange, size of the port seat, and otherwise, so that plumbers, in order to make repairs must carry with them a dozen or more different sizes of clamp rings, and discs in order to be prepared to make a renewal or repair.

It is therefore an aim of this invention to eliminate the requirement of carrying different sizes of facing elements, and to present a valve facing and mounting and securing means in an integral form, which will be extremely durable, and not liable to deterioration by corrosion, and which will also be free from the liability of water under pressure from the valve port gaining access to the platen face of the valve, under the valve facing.

I am aware of the practice of forming a removable valve facing of rubber, such as illustrated in the patent to Fritz et al., No. 1,947,257, February 13, 1934, and Jones, No. 413,518 of October 22, 1889, and it is my aim to effect a further improvement over the prior practice by obviating the need for special sizes of valves and valve heads, so that they may accommodate themselves to each other, and also to obviate the need for special forms of grooves on the valve heads and ribs on the valve facing elements, or vice versa, which would involve accuracy in size in order to enable the parts to fit together.

It is an especial aim of this invention to present a device adapted to use on the various products of different manufacturers in which rubber facings are used upon the ball-type valve, the head elements of which are usually cast and part machine finished, in such manner that there is a wide variation from standard size in the product, although those in which the clamping ring is employed are of a type generally corresponding to that shown in the views herein. In these valves a head portion is mounted upon a reduced stem or neck portion, both being formed integrally with a larger packing part as shown. The valve head is finished with a machined face at right angles to the longitudinal axis of the head portion, and in these devices the head portion, measured from the said planiform face to the junction of the neck therewith varies considerably in dimension longitudinally of the device in different valves, and at times varies considerably in the same valve at opposite sides. It is therefore an important aim of my invention to present a valve facing and securing means which will automatically adapt itself to these variations in size, enabling the continuance of production of the general style of head.

A further important aim is to present a facing and securing means which will be applicable to use to the circumferentially threaded head portion already produced and in use, and enabling my invention to be used as a replacement for the common flat disc and clamp ring, enabling the discarding of the clamp ring and the use of my single combined valve face and securing means therewith.

A further aim is to effect a combined device which will coact in a novel way with the conventional peripherally threaded head element of such valves for retention of the device.

Additional objects, advantages and features of invention reside in the construction, arrangement and combination of parts involved in the embodiment of the invention, as will be more readily understood from the following description and accompanying drawing, wherein:

Figure 1 is a perspective view of a combined facing and securing device embodying the invention.

Figure 2 is a longitudinal sectional view thereof.

Figure 3 is an end view thereof.

Figure 4 is an elevation of a conventional ball valve in which a flat disc and clamp ring are ordinarily used as a facing means, but showing my invention in course of application thereto.

Figure 5 is a similar view showing a further stage in the application of my invention.

Figure 6 is a similar view showing my device in full final applied position thereon.

Figure 7 is a similar view showing my device applied and in longitudinal section.

Figure 8 is an end view showing the face part of my facing element constituting an end view of Figure 6 from the right.

There is illustrated a well known type of ball cock valve stem 10, which includes a packing stem portion 11, at the outer end of which a stop flange 12 is formed, and on the adjacent end of which there is projected a yoke portion 13, apertured to receive therethrough the usual operating lever of a flush tank. The stem portion 11 is formed with a circumferential groove in which a familiar packing 14 is disposed, and upon the inner end of the stem there is projected a much reduced neck portion 15, on which a head 16 is formed spaced from the stem a distance, and enlarged and externally threaded, as shown, to receive the familiar clamping ring or "cap" by which the usual disc washer is clamped against the platen face of the head 16, which is usually a planiform machined face in a plane at right angles to the axis of the stem 10.

In the views, the device is shown approximately double the actual size customarily used, although as stated, there is some variation in size of the device as produced by the different manufacturers. The variations occur principally in the size of the head 16, the pitch of the threads thereof, and other details, which comprise no part materially affecting the present invention except as herein indicated. In one valve largely used, the head 16 is formed with a right hand end or platen face approximately five-eighths of an inch in diameter, and the measurements of the head from the end face to the inner termination of the head next to the neck 15 may vary between three-sixteenths of an inch and one-quarter of an inch. The neck portion 15 in such a valve would be approximately three-eighths of an inch in diameter immediately adjacent the head.

The valve facing and securing means in the present instance comprises a substantially thimble-shaped member of elastic rubber, including a head portion 18, which forms the facing of the valve subsequently, this head portion having an external surface approximately in the form of a hemisphere, the valve having a socket 19 therein with cylindrical side or sleeve walls, and extending into the head 18 a distance, the end face of the socket, however, not being parallel to the external face of the head, but being flattened, as at 20, so that the head wall is thickened at its central part. The side wall surfaces of the socket also are spaced slightly more from the base 21 of the head 18 than are the surfaces forming the junction of the side wall of the socket and the head wall 20 thereof, although this junction is curved, substantially, as shown in Figure 1. The body wall portion 22 of the device is extended a distance longitudinally from the thickened base portion 21, as shown at 22, with a thickness slightly less than the minimum thickness of the head portion 18 where the walls of the socket 19 approach closest to the external surface of the head 18. The side wall portions of the device are continued integrally from the part 22 longitudinally, with a slightly reduced thickness, as at 23. The actual size of the device as manufactured for application to a valve head of the sizes above described, would involve a diameter of one-half an inch at the base 21 of the head 18, and the internal diameter of the socket 19 would be approximately three-eighths of an inch. The portion of the wall 22 would extend for a distance longitudinally of approximately three-sixteenths of an inch, while the part 23 would extend slightly over one-eighth of an inch. It will be understood, of course, however, that these measurements are merely exemplary, and that the size and proportions of the device may be varied considerably to adapt it to various intended uses. The stated size of the article, however, for application to valve heads is adapted to use upon valves of a considerable range of size, and so far been found applicable to all ball cock valves used in conventional flush tanks for water closets. The rubber used in the article thus described is the same throughout, both in the head and the sleeve portion, and is preferably of a highly resilient, very tough, rubber which is adapted to stretch considerably, as may be appreciated, and will tend to recover its initial size after severe stretching.

In the use of this article, where the facing upon a conventional ball valve is to be renewed, the usual retaining ring or "cap" as called in the trade, is removed and the old washer and the cap both discarded. My new combined facing and retaining device is then engaged manually upon the head 16 of the valve device by inserting one side of the head into the open end of the device while with the fingers the open end is stretched entirely across the head and drawn thereonto by successive stages, as shown in Figures 4, 5, and 6, until the head portion 18 lies as nearly flat as possible against the platen or end face of the valve head. The internal diameter of the socket 19 being approximately three-eighths of an inch and the external diameter of the head 16 being approximately five-eighths of an inch, considerable stretching of the walls of the device are thus required. In this manner, the base line 21 of the head 18 is drawn close to the peripheral boundary of the stop face of the head 16, as shown in Figures 6 and 7, and the wall portion 22 approximately covers the threaded portion at the sides of the head 16, while the wall portion 23 contracts inwardly of the head, and forms a flange-like part 24 when the facing member is drawn fully upon the head 16. By reason of the severe distension of the wall 22, the inner surfaces are forced into the threads of the head 16, as shown in Figure 7, so that it becomes interfitted with the threads, adding to the security of the device against accidental longitudinal withdrawal from the head 16, in addition to which the contraction of the wall portion 23, as at 24, acts as a highly effective retaining means for the device, as well as a closure against the neck portion 15, by which access of water to the interior of the facing device is prevented.

While the wall portion 22 requires considerable stretching, in its introduction over the head of the valve, the dome-shaped head or facing portion 18 of the article, by reason of its shape does not require so much stretching. It is only necessary for the base 21 to be drawn outward slightly, because the external diameter of the article more nearly approximates that of the head 16, than does the initial interior diameter of the wall portion 22. Furthermore, by reason of the dome shape of the part 18, the central part does not offer material resistance to the drawing out of the base 21, and therefore the head 18—which subsequently constitutes the facing of the valve—is not placed under material tension, but is simply flattened, more or less. If the valve head 16 should be of a smaller diameter, the head 18 would not be completely flattened, but in case of a large diameter head 16 as in Figures 4 to 6, the head portion 18 may be flattened to an extent approximating that shown in Figure 7. The greater thickness of the head portion 18 throughout, causes the head to resist any tendency to draw a portion thereof onto the side of the head 16, and compels all accommodation to be effected by stretching of the wall portion 22. In consequence, the head 18 automatically centers itself on the head 16 so that a valve facing disc of uniform thickness fitted accurately to the head 16 is formed on the face of the head 16. In addition to the fact that the thinner wall portion 23 is adapted to be more safely stretched over the valve head without likelihood of tearing, splitting, or gouging the rubber thereof, it serves as a leading edge requiring the least manual effort for its engagement around the head 16, and then may be utilized to draw the thicker wall portion 23 longitudinally around the head 16 until the head 18 is fully alined with the edge of the valve platen. As indicated by the lead lines from the reference character 21, the boundary of the head 18 is defined by a slightly projecting continuous rib or thickening of the head, insuring its proper alinement with the platen surface of the head 16.

It will be readily appreciated that should there be a variation in the diameter of the head 16, either over or under standard dimensions, the wall 22 will accommodate itself thereto by contracting thereupon in either case, merely requiring slightly greater stretching in case of the larger size, when the device is applied to the valve head. Also, should the head have a greater measurement longitudinally than standard, the wall portion 23 will still be able to contract inwardly thereof, and in case the head is of less than standard longitudinal dimensions, this will be compensated for by more of the wall portion 23 or a part of the wall portion 22 contracting inwardly of the head of the valve, as will be readily understood. In either case, the extremity of the wall portions of the facing device will contract against the neck portion 15, forming a complete cap closure for the head of the valve and its neck portion for a distance, as shown in Figures 6 and 7.

On account of the fact that the valve seats which engage the usual valve disc in valves of this type is of much smaller diameter than the valve head, it will be appreciated that the head portion 18 of my device will fit equally well on a considerable range of sizes of valve seats or ports, without requiring special sizes in the head 18. Ordinarily, in the standard size the thickened portion of the central part of the head will function in a manner corresponding to the spherical face of a ball valve with an axially ball shaped valve element, although this may not be found material, since the elastic nature of my facing device will enable it to accommodate itself to valve seats with a slight pressure But when flush tank valves are involved, it will be appreciated that a very ready seating of my valve face will be effected under the operation of the usual float and operating levers involved in such devices. It has been found in practice that the rubber in my valve will function effectively in the wall parts 22 and 23 throughout the life of the head portion 18, or over a satisfactory period of time without failure due to deterioration of the rubber, and the difficulties involved by deterioration of the "cap" heretofore used as clamp rings for valve seat discs is entirely eliminated, since each renewal of the valve seat facing with my invention involves a self adaptation of the sleeve or wall portions 22—23 to the valve head appropriate to the particular size of the valve head.

The amount of material involved in the wall portions 22—23 is so small that the cost of the device is not increased appreciably over the cost of producing a simple valve head facing of the disc type, since my device is adapted to be produced by molding originally in its complete form, without requiring die-stamping or other machine operations in addition.

The saving in cost of time for labor in replacement is many times the cost of the complete device, for it is well known that costs for labor in plumbing repairs and replacements is high, and this saving is not only in the time required for the removal and replacement of parts, but also in obviating the need for searching for, and/or trying various sizes of "caps" in the conventional facing device, difficulties with matching threads, and otherwise.

I claim:

1. A facing for spigot valve heads and securing means combined, consisting of a member of highly elastic and resilient material substantially in the form of a thimble having a thick dome-shaped facing portion adapted to form the facing of an engaged valve, and integral, substantially cylindrical wall sleeve portions substantially thinner than the head portion of the thimble, and formed with a transverse diameter smaller than the diameter of the valve head to which it is to be applied, adapted to be engaged manually around a biscuit-shaped conventional spigot valve whereby sleeve portions will be stretched around the valve head and the extremity of the sleeve portion may contract inwardly of the valve head, substantially as described.

2. The structure of claim 1, in which the head portion of the device is initially substantially semispherical, and of a character and relation to the valve head to which it is applied such that when the facing is applied to the valve head with the walls thereof fully engaged around the valve head, the head portion of the facing member will be flattened toward the platen face of the valve, substantially as described.

3. The structure of claim 1, in which the wall portion of said facing element includes an integral substantially cylindrical part open at its outer end, being thick adjacent the head portion of the thimble for engagement around a valve head, said wall being much thinner adjacent its outer end portion.

4. The structure of claim 1 in which said head portion of the facing is substantially thicker than the wall portions, and in which the wall portion adjacent the head is substantially thicker than the outer wall portion, the said outer wall portion being comparatively thin and adapted to be stretched over a valve head of much greater diameter by manual application.

5. The article of claim 1 in which the junction of the head portion of the facing with said wall portion is defined by an external circumscribing rib.

WALTER J. CAMPBELL.